(12) United States Patent
Lipton

(10) Patent No.: US 7,088,515 B2
(45) Date of Patent: Aug. 8, 2006

(54) AUTOSTEREOSCOPIC LENS SHEET WITH PLANAR AREAS

(75) Inventor: Lenny Lipton, Greenbrae, CA (US)

(73) Assignee: StereoGraphics Corporation, Beverly Hills, CA (US)

( * ) Notice: Subject to any disclaimer, the term of this patent is extended or adjusted under 35 U.S.C. 154(b) by 98 days.

(21) Appl. No.: 10/779,143

(22) Filed: Feb. 12, 2004

(65) Prior Publication Data

US 2005/0286133 A1   Dec. 29, 2005

Related U.S. Application Data

(60) Provisional application No. 60/447,088, filed on Feb. 12, 2003.

(51) Int. Cl.
*G02B 27/10* (2006.01)
*G03B 21/60* (2006.01)

(52) U.S. Cl. .................... 359/619; 359/454; 359/455; 359/456

(58) Field of Classification Search ................ 359/619, 359/454, 455, 456
See application file for complete search history.

(56) References Cited

U.S. PATENT DOCUMENTS 5,611,611 A * 3/1997 Ogino et al. .................. 353/74

* cited by examiner

*Primary Examiner*—David N. Spector
(74) *Attorney, Agent, or Firm*—Smyrski Law Group, A P.C.

(57) ABSTRACT

A dual mode autostereoscopic lens sheet. The lens sheet has at least one refractive region and at least one non-refractive region. When the lens sheet is held in intimate juxtaposition with a display, stereoscopic content may be viewed in the refractive region while planar content may be simultaneously viewed in the non-refractive region. In a preferred embodiment, the non-refractive region forms a vertical column on one end of the lens sheet and the refractive region forms a vertical column on the other end of the lens sheet. Advantageously, the refractive region defines a picture area having an aspect ratio of approximately 1.3:1.

18 Claims, 1 Drawing Sheet

AUTOSTEREOSCOPIC LENS SHEET WITH PLANAR AREAS

This application claims priority from U.S. Provisional Patent App. No. 60/447,088 filed Feb. 12, 2003.

BACKGROUND OF THE INVENTION

The technology of electronic autostereoscopic displays, usually involving flat panels, has advanced to the point where it is now viable for many applications. Dedicated autostereoscopic displays are available, but there are computer users who want the ability to move between planar applications, such as word processing, and stereoscopic visualization applications, and still obtain a clear image for both types of applications. There are some technologies which allow for dual mode monitors that function in either an autostereoscopic mode or planar mode, but not in both modes simultaneously.

For displays using a lenticular (or raster barrier) selection device, a significant problem is that the refractive properties of the lens sheet fragments distorts small point type and fine-resolution image elements such as desktop icons, task bars, and drop-down menus. Thus, with the lens sheet in place, the autostereoscopic monitor can typically not be used to simultaneously view both stereoscopic information and fine type or icons. Many approaches have been previously considered to address this problem. For example, a display utilizing an overlay such as a lenticular screen has been described in co-pending U.S. patent application Ser. No. 09/943,890, entitled AUTOSTEREOSCOPIC LENTICULAR SCREEN. With the lenticular ridges facing inward towards the flat panel surface, a chamber is created between the flat panel surface and the lenticular ridges to hold a liquid that is emptied to provide 3-D viewing and filled to defeat the refraction properties of the screen.

U.S. Pat. No. 5,500,765, entitled CONVERTIBLE 2D/3D AUTOSTERESCOPIC DISPLAY discloses a display having a lenticular overlay in close contact with the flat panel front surface, but with the ridges facing outward. To defeat the lenticular "refractive" characteristics, a mating inverse lenticular screen is placed atop the lenticular screen in proper alignment so that the overlaid screen will negate the refraction of the original.

Another approach is to fabricate a removable lenticular screen that is held firmly in precision alignment when placed in intimate juxtaposition with the flat panel display.

Another approach, described in press releases by Sharp and DTI technologies, involves the use of a liquid crystal modulator in proper proximity to the imaging display surface. The modulator is made up of rulings that can be turned on and off to transition between a raster barrier and a clear cover sheet. When in the raster barrier mode, a stereoscopic image can be observed. This is well-known art and therefore not described herein. However, it is of interest to note that from an optical standpoint, lens sheets and raster barriers are more or less interchangeable, and information prepared for one can be displayed using the other. Therefore, although the inventive technique disclosed herein is described with reference to lenticular sheets, it also applies in principal to the raster barrier selection device technique.

Whatever the merits of these two-state approaches (stereo and planar), they do not solve the essential problem of enabling the user to clearly see some areas of the display screen autostereoscopically and some areas in the planar mode. In this disclosure, a means for simulataneously displaying both stereoscopic and planar information in selected areas of the display is revealed.

SUMMARY OF THE INVENTION

Figures 1, 2:
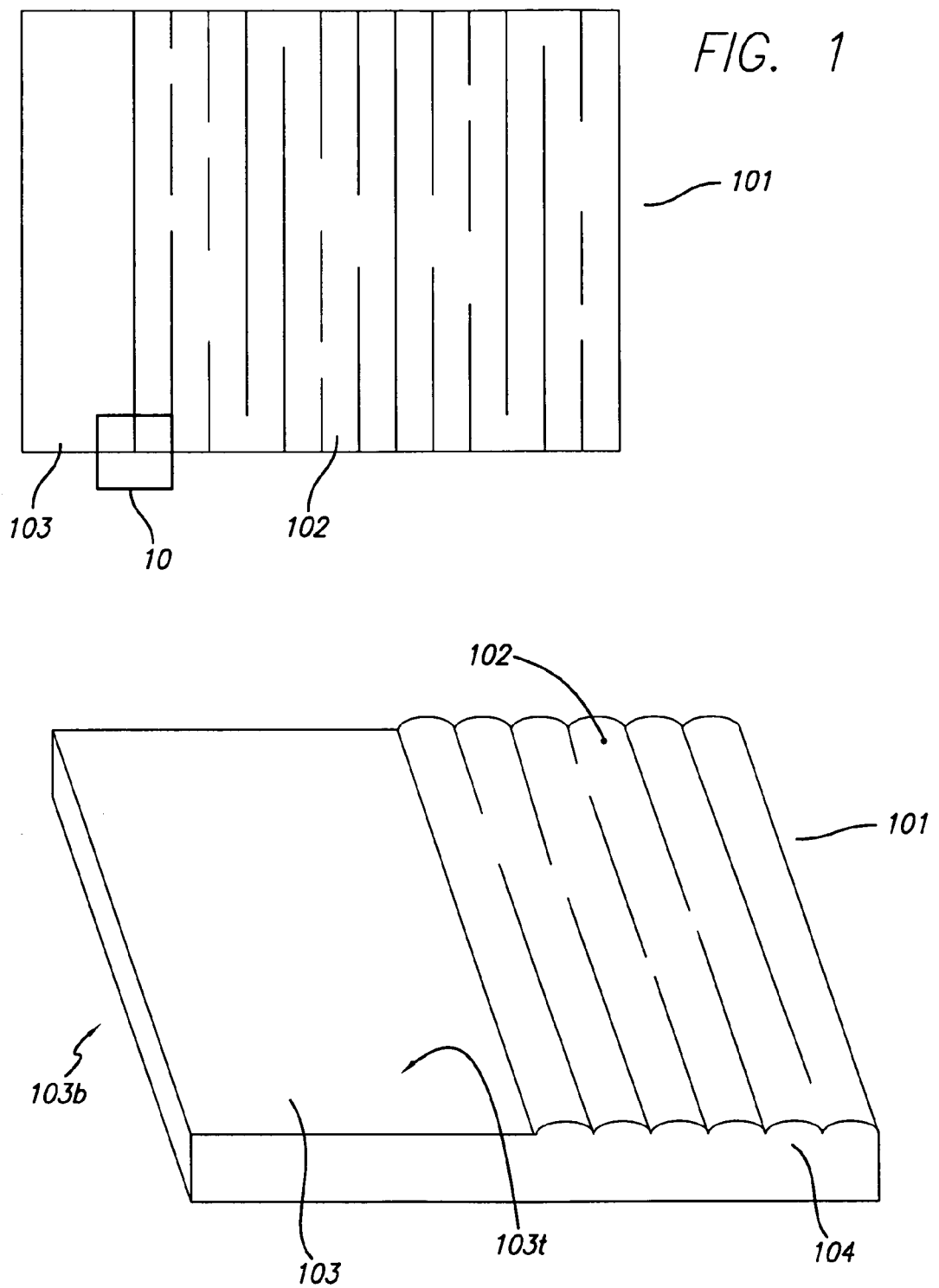
FIG. 1 is a schematic representation of a lens sheet having refractive and non-refractive regions in accord with the present invention.
FIG. 2 is a perspective view of a portion of the lens sheet shown in FIG. 1.

A dual mode lens sheet is disclosed. The lens sheet has at least one refractive region and at least one non-refractive region. When the lens sheet is held in intimate juxtaposition with a display, stereoscopic content may be viewed in the refractive region while planar content may be simultaneously viewed in the non-refractive region. In one preferred embodiment, the non-refractive region forms a vertical column on one end of the lens sheet and the refractive region forms a vertical column on the other end of the lens sheet. Advantageously, the refractive region defines a picture area having an aspect ratio of approximately 1.3:1. The refractive region is comprised of lenticules, which art typically oriented at a right angle to the horizontal edge of the display, but may be oriented at any angle relative to the horizontal edge of the display.

DETAILED DESCRIPTION OF THE INVENTION

FIG. 1 illustrates a lens sheet 101 having a refractive region 102 and a non-refractive region 103. FIG. 2 is a perspective view of a smaller area 10 of the lens sheet shown in FIG. 1. Thus, the lens sheet 101 is partly refractive and partly non-refractive.

The refractive region 102 includes lenticules 104 whose surfaces typically are a section of a circle, or a sector, and whose rulings are corduroy-like or washtub-like. U.S. Pat. No. 1,128,979 to Hess first described such lenticules, and there are many prior art references describing autostereoscopic display systems using such lenticules. The use and manufacture of such lenticules is well known and not described herein.

The non-refractive region 103 functions like a cover glass and does not have the refractive properties of lenticular region 102, although oblique rays will suffer some refraction through this region.

As has been discussed above, lens sheets can obscure small point text and image detail when employed with flat-panel displays. For this reason, some means needs to be devised so that planar material can be read by the user of, for example, a computer graphics display. By assigning certain portions of the screen to non-refractive purposes, the intrinsic resolution of the screen is employed in those non-refractive areas. The software application can place the planar material in those specified areas, or such material can be dragged and dropped by the user into the non-refractive areas using a computer mouse and standard GUI techniques.

In FIG. 1, the non-refractive region 103 is depicted as a vertical column on one end of the lens sheet. One can well imagine regions which are rectangular, triangular, or covering a horizontal row (and so on and so forth for regions of various shapes, sizes and locations) rather than a vertical column as shown. There are many possibilities. If the application developer controls where dropdown menus appear, for example, such a scheme is perfectly feasible. The user clearly sees a proper autostereoscopic image if it is placed in the lenticular region 102.

Various manufacturing techniques can be used to achieve the disposition of refractive and non-refractive areas. Lenticules can be cast, applied, or laminated to a substrate, and part of the mold or tool can be a plane surface to produce the non-refractive region. Stamping or pressing techniques of various kinds can be used in which there is in effect no substrate, but the entire material forms a continuous whole with the lenticules on one portion and non-lenticules on the other proportion.

It should be obvious that the non-refractive region 103 has two plane surfaces 103*t* and 103*b* that are parallel to each other, and such a material is similar to a cover glass or a cover sheet that is used for framing pictures or is used as an antireflection screen in computer or similar displays.

Although the illustrations convey that the lenticules are vertical-going—in other words the boundaries between each lenticule form parallel lines which are oriented in a vertical direction or in a direction such that they are perpendicular to the horizontal edge of the display—it's also possible that the teachings of U.S. Pat. No. 3,409,351 to Winnek can be employed so that these lenticules, or rather their boundary lines, can be at some angle rather than at right angles to the horizontal edge of the lens sheet, assuming that the horizontal edge and vertical edges of the lens sheet correspond to the horizontal and vertical edges of the display, and that indeed the horizontal edge is essentially parallel to the horizon.

There are many possible variations, but the essence of the invention is that there are lenticular regions and non-lenticular regions on the lens sheet. The lens sheet is held in close proximity and with its rear surface parallel to the plane surface of a display. Most typically, such a display will be a flat-panel display, such as a liquid crystal or plasma screen. It should be obvious to those in the art that many variations are possible in terms of the disposition of refractive and non-refractive areas, and although for didactic purposes manufacturing techniques have been briefly described or suggested, there is nothing in this disclosure that limits the art taught here to any specific manufacturing technique.

There are also some new display screens for computer graphics and other purposes such as television that follow the high-definition-television aspect ratio, which is approximately 1.8:1. Since the usual computer graphics (and television screen) uses an aspect ratio of 1.3:1, one can readily see the usefulness of a scheme in which a non-refractive vertical column at the left or the right edge of the picture is employed while preserving a lenticular picture area that is 1.3:1. In other words, the picture area that the user expects, with an aspect ratio of 1.3:1, would be preserved and the surplus would be devoted to the non-refractive area so that alphanumerics and icons and similar material can be displayed to best advantage.

The invention claimed is:

1. A lens sheet, comprising at least one refractive region and at least one non-refractive region, wherein the lens sheet is configured to allow relatively clear viewing of stereoscopic images through each refractive region and nonstereoscopic images through each non-refractive region.

2. A lens sheet as in claim 1, wherein the refractive region is comprised of lenticules.

3. A lens sheet as in claim 2, wherein the lenticules are oriented at a right angle to a horizontal edge of the lens sheet.

4. A lens sheet as in claim 2, wherein the lenticules are oriented at an acute angle to a horizontal edge of the lens sheet.

5. A lens sheet as in claim 1, wherein the non-refractive region forms a vertical column on one end of the lens sheet and the refractive region forms a vertical column on the other end of the lens sheet.

6. A lens sheet as in claim 5, wherein the refractive region defines a picture area having an aspect ratio of approximately 1.3:1.

7. An autostereoscopic display, comprising:
a display;
a lens sheet held in intimate juxtaposition with the display, wherein the lens sheet includes at least one refractive region configured to provide clear stereoscopic images transmitted by the display and at least one non-refractive region configured to provide clear planar images transmitted by the display.

8. An autostereoscopic display as in claim 7, wherein the non-refractive region forms a vertical column on one end of the lens sheet and the refractive region forms a vertical column on the other end of the lens sheet.

9. An autostereoscopic display as in claim 8, wherein the refractive region defines a picture area having an aspect ratio of approximately 1.3:1.

10. An autostereoscopic display as in claim 7, wherein the refractive region is comprised of lenticules.

11. An autostereoscopic display as in claim 10, wherein the lenticules are oriented at a right angle to a horizontal edge of the lens sheet.

12. An autostereoscopic display as in claim 10, wherein the lenticules are oriented at an acute angle to a horizontal edge of the lens sheet.

13. A lens sheet, comprising:
at least one refractive region, said at least one refractive region configured to receive stereoscopic images and relatively clearly display the stereoscopic images to a viewer; and
at least one non-refractive region, said at least one non-refractive region configured to receive planar images and relatively clearly display the planar images to the viewer.

14. A lens sheet as in claim 13, wherein the refractive region is comprised of lenticules.

15. A lens sheet as in claim 14, wherein the lenticules are oriented at a right angle to a horizontal edge of the lens sheet.

16. A lens sheet as in claim 14, wherein the lenticules are oriented at an acute angle to a horizontal edge of the lens sheet.

17. A lens sheet as in claim 13, wherein the non-refractive region forms a vertical column on one end of the lens sheet and the refractive region forms a vertical column on the other end of the lens sheet.

18. A lens sheet as in claim 17, wherein the refractive region defines a picture area having an aspect ratio of approximately 1.3:1.

* * * * *